United States Patent [19]

Robinson

[11] 4,235,576

[45] Nov. 25, 1980

[54] PRESSES

[75] Inventor: William D. Robinson, Ipswich, England

[73] Assignee: Delta Materials Research Limited, England

[21] Appl. No.: 948,257

[22] Filed: Oct. 3, 1978

[30] Foreign Application Priority Data

Oct. 3, 1977 [GB] United Kingdom ............... 41034/77

[51] Int. Cl.[3] ........................... B29C 3/00; B30B 15/16

[52] U.S. Cl. ................................. 425/138; 425/451.2; 425/590; 100/269 R; 188/266; 188/268; 188/269; 188/297

[58] Field of Search ...................... 425/451.2, 451, 590; 188/268, 269, 297, 266

[56] References Cited

U.S. PATENT DOCUMENTS

| | | | |
|---|---|---|---|
| 2,856,035 | 10/1958 | Rohacs | 188/269 |
| 3,571,855 | 3/1971 | Hafer et al. | 425/151 |
| 3,712,774 | 1/1973 | Parker | 425/451.2 X |

*Primary Examiner*—J. Howard Flint, Jr.
*Attorney, Agent, or Firm*—Bernard & Brown

[57] ABSTRACT

A mechanical press has a self-adjusting device for automatically setting the position of the mould in the correct position with respect to the stroke of the pressram. The device is located between a fixed platen and a mould carrier and comprises a cylinder having at one end a stiffly resilient plug which normally covers a valve port in the cylinder; a volume of liquid is located between a piston in the cylinder and the plug. If the mould is incorrectly set for the ram stroke, the pressure generated in the liquid so compresses the plug to expose the port for release of sufficient liquid to reposition the mould.

4 Claims, 2 Drawing Figures

PRESSES

Figure 1:
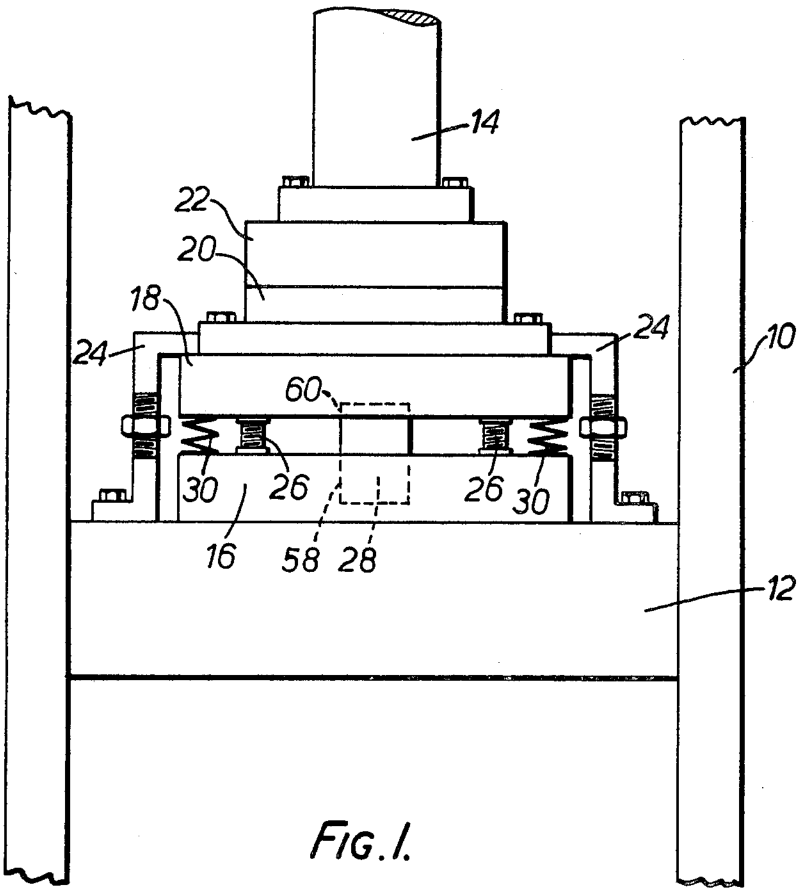

The present invention relates to presses and is more particularly concerned with a device for controlling the operation of a mechanical press to avoid overloading due to incorrect positioning of a mould or platen in relation to the stroke of the press.

A mechanical crank press normally has a fixed ram stroke length. When the press is to be used with a mould or a former, for example in hot stamping, drawing and embossing operations, it is important that the mould or former should be so located in relation to the stroke that the press ram reaches the end of its stroke coincident with the mould closing, and not subsequently. If the mould is closed before the ram reaches the end of the stroke, i.e. before the crank of the press reaches the bottom dead centre position, the press is subject to substantial overloading, which can cause damage to the crankshaft and excessive noise generation. Further, with a badly set press, the crankshaft becomes locked at the bottom of the ram stroke, if the press has insufficient power to complete the stroke; when that occurs, major maintenance is required to free the press.

It is of course possible to adjust the position of the mould in relation to the press ram stroke, either by adjusting the setting of a carrier on which the mould is located, or by altering the effective length of the ram. Much skill is required to set a press correctly, so that the mould is properly closed at the end of the ram stroke, and not before. Failure to do so gives rise to overloading of the press frame and the danger of crankshaft damage and/or locking of the press as described above.

Devices have been previously proposed to minimize the dangers of incorrect press setting. One such device takes the form of tubes filled with ball bearings located behind the mould carrier; when press jamming occurs, the ball bearings are freed to run out of the tubes and allow downward displacement of the mould and so reduce the force on the crankshaft. However, once such a device has been used, the press cannot be reemployed until a similar device has been placed in position. Another overload device takes the form of a mass of extrudable material, such as lead or a polymer, which is closely confined in a container having a small outlet. The device is again located against the mould carrier and, when the press is improperly set, the resulting overload causes material to be extruded from the container to cause resetting of the mould in relation to the ram stroke and to remove the overload condition. The disadvantage of the latter device is that it can be used only once and must be replaced by a similar device once extrusion has taken place.

An object of the present invention is to provide a device for a press that will automatically adjust the setting of the press when an overload occurs and which needs little maintenance between successive uses.

Another object is to protect a crank press from danger of crankshaft damage and to avoid the excessive noise which can be generated as a result of the press being badly set.

A press according to the present invention includes a reciprocable ram, a platen towards and away from which the ram reciprocates, a workpiece carrier supported by the platen and located between the platen and the ram and a self-adjusting device operatively between the platen and the carrier for adjusting the position of the carrier in relation to the stroke of the ram; that device comprises a fluid-containing cylinder, a cooperating piston movable in the cylinder, a normally closed valve in the cylinder for release of some of the fluid when opened, and means for opening the valve when the pressure of the fluid exceeds a given value and for closing the valve after the pressure has fallen. In use, and where the workpiece carrier has been wrongly set so that an overload condition occurs at the end of the compressive stroke of the ram, the valve is automatically opened and sufficient fluid is released from the cylinder, firstly to cause the removal of the overload condition, and secondly to alter the setting of the workpiece carrier in relation to the ram stroke towards the correctly set position.

Figure 2:
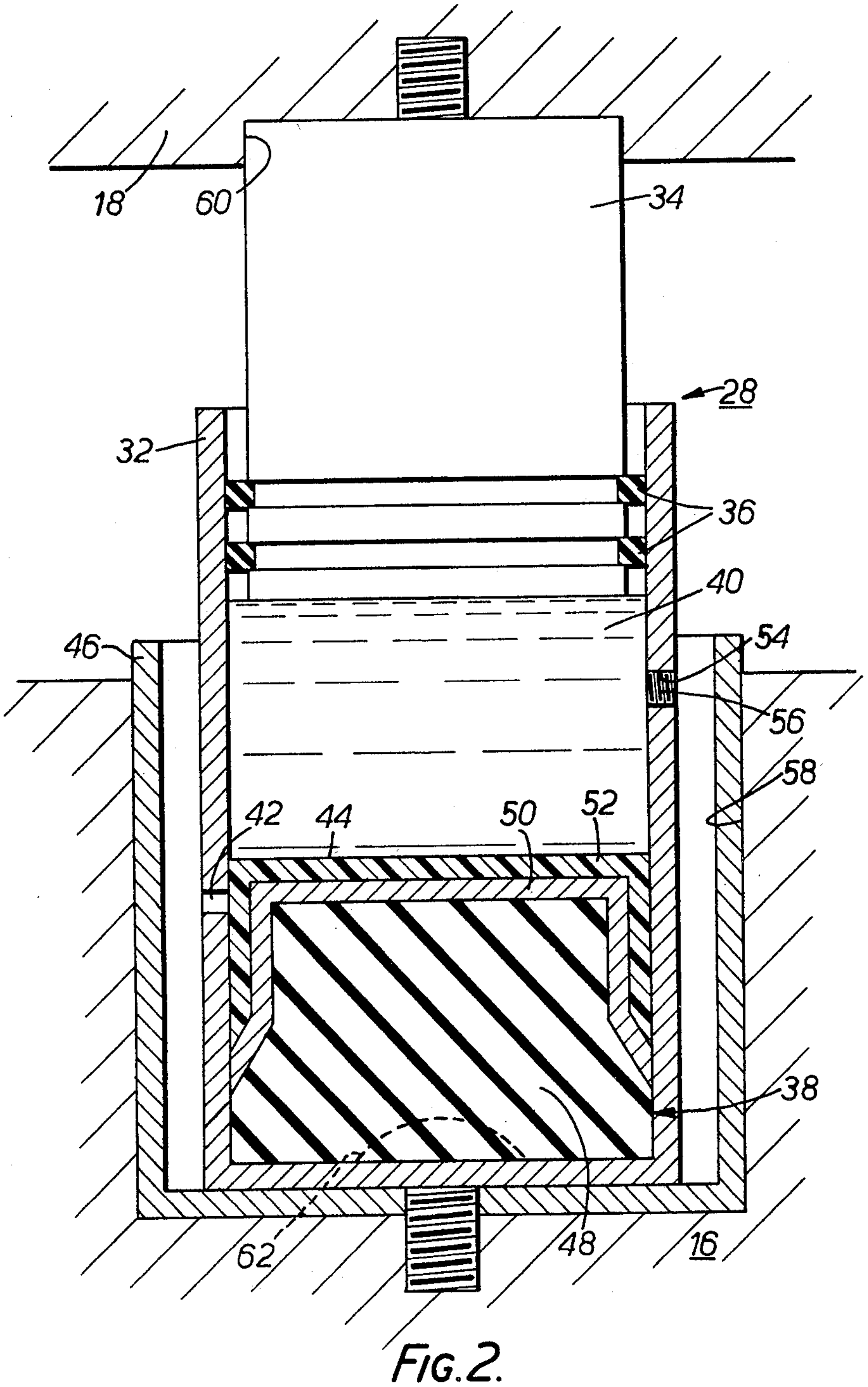

Further objects and advantages of the invention will become apparent from the following description of a press in accordance with the invention, reference being made to the accompany drawings, in which:

FIG. 1 diagrammatically illustrates the press and,

FIG. 2 is a vertical section, on an enlarged scale, of the self-adjusting setting device for the workpiece carrier.

The press is of well known type having a press frame 10, a press bed plate or platen 12 and a fixed throw press ram 14. The press ram 14 is reciprocated mechanically by a power-driven crank which can be for example of the key clutch type or the friction clutch type. Such presses are so well known, further description of the mechanism for reciprocating the press ram 14 is unnecessary.

The fixed platen 12 carries a support plate 16 which supports a workpiece carrier 18, which can be adjusted in its separation from the platen 12 in order to set the press. The carrier 18 in turn supports a mould or former 20 for performing a hot stamping, drawing or embossing operation. The press ram 14 carries a press tool 22 which, when the press is properly set, closes on the mould 20 at the end of the compressive stroke of the ram 14 in order to perform the required shaping of the workpiece (not shown) within the mould 20.

When the press has been properly set, i.e. when the carrier 18 has been properly located in relation to the platen 12, the carrier 18 is locked in position by a series of adjustable clamps, two of which are shown at 24, and by adjustable screw jacks 26 interposed between the plate 16 and the carrier 18. As shown in FIG. 1, each of the adjustable clamps 24 is bolted at one end to the platen 12 and, at the other end, overlies the carrier 18. Lastly, a self-adjusting setting device 28, to be described in detail here and after with relation to FIG. 2, is disposed between the plate 16 and the carrier 18, between which are also located a number, for example four, of stiff stabilising springs 30.

Referring now to FIG. 2, the self-adjusting setting device consists basically of a cylinder 32 and a cooperating piston 34 having piston rings 36 in sealing engagement with the bore of the cylinder 32. A plug 38 is closely received in the end of the cylinder 32 and a volume of hydraulic liquid 40 is contained within the cylinder between the piston 34 and the plug 38. A valve port 42 is formed in the cylinder wall at a level below the free face 44 of the plug 38, when the latter is undeformed. The cylinder 32 is located in a cup 46 which catches any hydraulic liquid displaced from within the cylinder through port 42, as described later.

The plug 38 is stiffly resilient and for that purpose consists of a plug body 48 made of a suitable elastomer, such as a natural or synthetic rubber and preferably a silicon rubber. The plug body 48 is surmounted by a steel retaining cap 50, which in turn carries a sealing cap 52 made of plastics material. As will be observed, the cap 52 extends around the side of the plug and is in contact with the bore of the cylinder 32 over a substantial axial length. It seals the plug to the cylinder and prevents leakage of liquid 40 to and through the port 42, except when the port 42 is exposed on sufficient compression of the plug. Lastly, there is a further port 54 in the wall of the cylinder, and a removable plug 56 normally closing that port, which is used to enable liquid to be charged into the cylinder 32, or to top up the level of the liquid 40.

In use the device as shown in FIG. 2 is secured in position as shown in FIG. 1 by mounting the cup 46 in a recess 58 centrally in the plate 16 and the piston 34 in a recess 60 centrally in the underside of the carrier 18. Alternatively, the device can be reversed, with the piston 34 secured in the plate 16 and the cylinder 32 secured in the underside of the platen 18. For the setting of the press, the clamps 24 and the screw jacks 26 are either removed or slackened off to allow free movement of the carrier 18 relative to the platen 12; the carrier 18 is stabilisedagainst cant by the springs 30. The position of the carrier 18, and hence the mould 20 is then determined by the volume of liquid 40 within the cylinder 32 and that volume is so chosen that the press tool 22 closes on the mould 20 before the end of the compressive stroke of the ram 14 is reached.

The press is then closed, preferably without a workpiece within the mould 20. When the press tool 22 engages the mould 20, the press is subject to overload condition, which causes the pressure of the liquid 40 to increase and the plug 38 to be compressed axially. The high bulk modulus of the plug body 48 is so chosen that, when the pressure exceeds a value in excess of that normally experienced during the press operation, the plug 38 is sufficiently compressed to expose the valve port 42 to the liquid 40. When that occurs, liquid escapes through the port 42, with the results that, firstly, a part of the pressure of the liquid 40 is relieved and, secondly, that when the press tool 22 is withdrawn, the position of the carrier 18, and hence of the mould 20 is lower than the initial position.

It may be that after a single cycle of the press, the mould will be properly set by the operation described above, the press tool 22 then closing on the mould 20 at the end of its compressive stroke and at bottom dead centre of the crank; in that condition, when the press tool closes on the mould, the plug 38 is only so compressed that its upper face 44 is immediately above the port 42. However, in most cases, a number of cycles of the press is required before the press is properly set.

When proper setting has been achieved, the carrier 18 is locked in position by the clamps 24 and the screw jacks 26 and the press is operated with the carrier so locked. When the press is to be used for a different operation or to form a different shape of workpiece, it may be necessary before the mould is used to top up the liquid 40 in the cylinder 32, so that the mould can again be automatically set for the new operation. It may also be necessary to replace the existing plug 38 by another plug having different compressive properties, the replacement plug being chosen to open the valve port 42 at a safe overload pressure in excess of the proper press operation. For the latter purpose, a series of plugs 38 may be provided, the axial dimensions and the bulk moduli of the bodies 48 being selected so that the different plugs open the valve port 42 at different pressure levels.

Various modifications in the apparatus described and illustrated are of course possible. Thus, the plug body 48 may have a central void, illustrated in chain line in FIG. 2 at 62 in order to assist the proper compression of the plug 38 under the pressure of the liquid 40; during compression, the material of the body is deformed into the void. The valve port 42 is shown as having a circular cross section. However, the cross sectional form of the port may differ from circular, if it should become necessary in order to obtain a good flow rate of liquid when the port is exposed but to minimise leakage once the proper press setting has been achieved and the port 42 continually closed by the plug; with this in view, the port 42 may have a triangular or other cross section such that the rate at which the cross sectional area of the exposed port enlarges as the plug is compressed increases as the upper surface 44 of the plug falls.

Lastly, valve mechanisms other than that illustrated in the drawings can be employed to cause opening of a valve to release some of the liquid 40, when an overload condition arises.

What I claim as my invention and desire to secure by Letters Patent is:

1. A press including
(a) a reciprocable ram reciprocal with a determined stroke,
(b) a platen towards and away from which, said ram reciprocates,
(c) a workpiece carrier supported by said platen between said platen and said ram, and
(d) a self-adjusting device operatively between said platen and said carrier for adjusting the position of said carrier in relation to the stroke of said ram, said device comprising,
(e) a fluid-containing cylinder operatively connected to one of said carrier and said platen,
(f) a cooperating piston movable in said cylinder and operatively connected to the other of said carrier and said platen,
(g) a normally closed valve in said cylinder for permanent discharge of some of said fluid when opened, and
(h) means for opening said valve when the pressure of said fluid exceeds a given value and for closing said valve after said pressure has fallen, whereby, if during a stroke of said ram towards said platen the liquid pressure exceeds said given value, liquid is discharged through said valve until the pressure drops, and whereby said carrier is brought closer to said platen for subsequent press strokes.

2. A mechanical press including
(a) a press ram reciprocable with a determined stroke,
(b) a platen towards, and away from which said ram reciprocates,
(c) a workpiece carrier supported by said platen between said platen and said ram, and
(d) a self-adjusting device operatively between said platen and said carrier for adjusting the position of said carrier in relation to the state of said ram, said device comprising
(e) a cylinder operatively connected to one of said platen and carrier,
(f) a piston movable in said cylinder and operatively connected to the other of said platen and carrier, (g) a stiffly compressible plug located in said cylinder and separated from said piston by a volume of liquid, and (h) a valve port in said cylinder, said port being normally closed by said plug but being exposed for permanent discharge of some of said liquid when said plug is sufficiently compressed by rise of pressure of said liquid above a given value, whereby if during a stroke of said ram towards said platen the liquid pressure exceeds said given value, liquid is discharged through said valve until the pressure drops, and whereby said carrier is brought closer to said platen for subsequent press strokes.

3. A press as claimed in claim 2, wherein said plug comprises a plug body of an elastomeric material closely confined in the end of said cylinder distant from said piston, and a sealing cap in sealing engagement with said cylinder.

4. A press as claimed in claim 3, wherein a metal retaining cap is interposed between said plug body and said sealing cap.

* * * * *